United States Patent

Tittman et al.

[15] 3,654,467
[45] Apr. 4, 1972

[54] TRANSPLUTONIUM NEUTRON ACTIVATION LOGGING TECHNIQUE

[72] Inventors: Jay Tittman; William B. Nelligan, both of Danbury; John S. Wahl; Harold Sherman, both of Ridgefield, all of Conn.

[73] Assignee: Schlumberger Technology Corporation, New York, N.Y.

[22] Filed: May 12, 1969

[21] Appl. No.: 823,665

[52] U.S. Cl. .................................. 250/83.1, 250/83.6 W
[51] Int. Cl. ........................................................ G01t 3/00
[58] Field of Search ................. 250/71.5, 83.3, 83.6 W, 83.1

[56] References Cited

UNITED STATES PATENTS 3,294,972  12/1966  Youmans ....................... 250/83.6 X
3,462,600  8/1969   Dewan .......................... 250/83.6 X
3,463,922  8/1969   Senftle et al. ................. 250/83.3

Primary Examiner—James W. Lawrence
Assistant Examiner—Davis L. Willis
Attorney—William R. Sherman, Donald H. Fidler, Stewart F. Moore and John P. Sinnott

[57] ABSTRACT

A typical embodiment of the invention enables neutrons of low average energy that characteristically are emitted from californium 252 ($Cf^{252}$) to react with, or fail to react with, nuclei within an earth formation, depending on the energy threshold for the reaction in question. The neutron activation induced by means of the $Cf^{252}$ source is compared with the response induced in the formation through neutrons of higher average energies from other sources. The activation comparison permits the identification of elements and minerals in the formation to be determined accurately.

5 Claims, 1 Drawing Figure

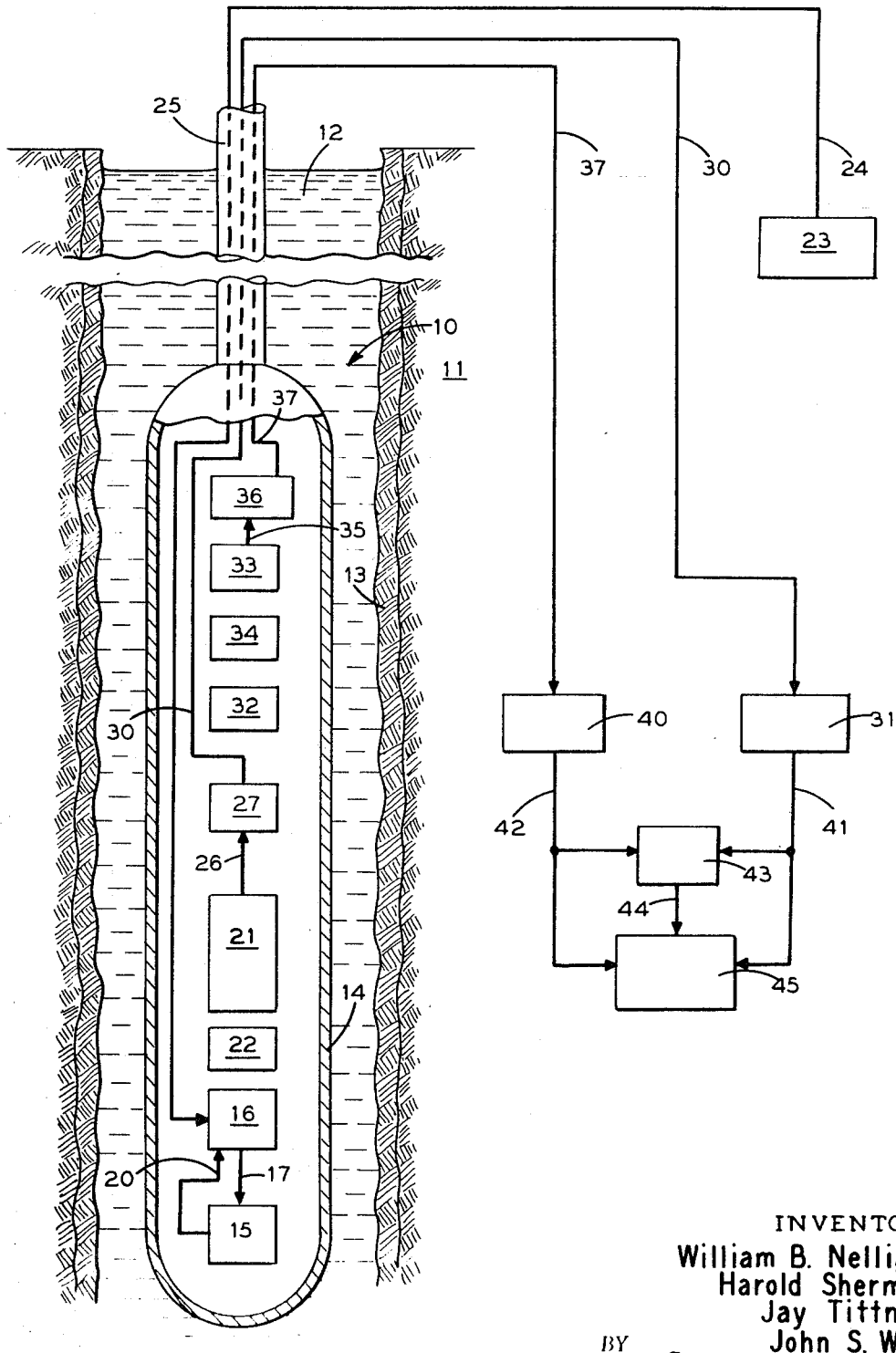

TRANSPLUTONIUM NEUTRON ACTIVATION LOGGING TECHNIQUE

BACKGROUND OF THE INVENTION

1. Field of the Invention

This invention relates to borehole logging techniques and, more particularly, to a neutron technique for identifying the minerals or elements in an earth formation, and the like.

2. Description of the Prior Art

Logging tools containing two sources that emit neutrons with different respective average energies have been suggested. These proposals have been advanced in order to establish a differential neutron activation log that depends on neutron reaction energy thresholds. For example, oxygen logging tools have been proposed in which one source emits neutrons that are sufficiently energetic to cause the production of nitrogen 16 ($N^{16}$). Another source in the tool generates neutrons with an average energy that is not sufficient to initiate $N^{16}$ production. The two induced neutron activities, when contrasted, provide some indication of the oxygen concentration in the earth formation.

Proposals of this sort, however, have been unsatisfactory. For example, within the confines of safe and economical operation conventional "chemical" sources that rely on alpha-beryllium reactions for neutron production do not produce a sufficient abundance of neutrons to enable statistically valid differential activation logs to be developed in a commercially interesting range of formations and borehole environment conditions. In this regard, the observed activity induced in the formation must be sufficiently intense to enable valid conclusions to be drawn with regard to the phenomena under observation within industrially acceptable logging times.

Thus, a need exists for a source that emits neutrons of low average energy. The neutron production characterizing this source moreover, must be sufficient to produce a statistically acceptable response from most earth formations under continuous logging conditions.

In this regard, deuterium-tritium sources that produce 14 MeV neutrons with neutron outputs in the vicinity of $10^8$ per second are available for well logging use. This neutron intensity often is acceptable for economically viable activation logging but is not entirely adequate in other respects.

For example, aluminum activation is of interest in petroleum exploration because this element is a relatively constant constituent in shale. Shale is frequently mixed with sand and often produces misleading logging measurements as well as affecting the manner in which an oil reservoir can be produced. Consequently, the determination of shaliness is of widespread commercial importance. If shaliness can be measured through an accurate evaluation of aluminum content, a new logging service of broad applicability would result.

The principal method for aluminum activation is through the capture of thermal neutrons in aluminum 27 ($Al^{27}$). This generates aluminum 28 ($Al^{28}$) that has a decay time of 2.3 minutes with the emission of a characteristic 1.8 MeV gamma ray. For a source to have acceptable intensity it must permit the continuous logging of this activity at speeds of 600 feet per hour and greater.

Silicon, however, is often present in both sands and shale. A fast neutron reaction with silicon produces the same $Al^{28}$ isotope through a neutron-proton (n,p) reaction, with a reaction energy threshold of about 4.5 MeV. This route to the production of radioactive $Al^{28}$ in earth formations is usually much more common than that through thermal neutron capture in $Al^{27}$, if a 14 MeV deuterium-tritium source is used. Even alpha-beryllium neutrons produce more silicon activation because the silicon concentration usually exceeds that of aluminum.

SUMMARY

In accordance with the invention, these problems are ameliorated through an intense $Cf^{252}$ source. $Cf^{252}$ has relatively few neutrons with energy above 4.5 MeV. Thus, aluminum concentration may be determined through thermal neutron absorption to the almost complete exclusion of any neutron-induced silicon influence. The $Cf^{252}$ neutron induced activity also can be compared with the 2.3-minute silicon-originated activity resulting from 14 MeV deuterium-tritium neutrons as a means of correcting for silicon effects.

Through the use of $Cf^{252}$, other well-known activities now become a practical commercial matter.

Copper can be activated through thermal neutron capture. So activated, the copper emits a 1 MeV gamma ray that is more easily identified since there is less background gamma radiation such as is produced when higher average energy neutron sources are used. The production of this activity in exploratory core holes can permit rapid and relatively inexpensive determination of copper concentration in ore.

Sodium, like aluminum, also can be used as an indicator for shaliness. Further, a knowledge of sodium concentration can be combined with that of chlorine to permit the correction of other logs for shaliness. In open boreholes, the chlorine concentration in formation fluids can be determined by electrical resistivity logging; in cased holes, thermal neutron decay time logging can be used. Through thermal neutron capture, sodium produces an isomer with 20 msec. half-life, emitting a 470 keV gamma ray. This same sodium activity can be produced through fast neutron interactions in aluminum and magnesium, leading to confusing interpretation problems if alpha-beryllium or 14 MeV deuterium-tritium neutrons are used. The lower energy neutrons from $Cf^{252}$ will relieve this situation because the reaction through aluminum has a 3.7 MeV threshold and the reaction through magnesium 5.4 MeV.

Accordingly, sodium activity can be identified through circuitry that enables the 470 keV gamma ray to be selected for subsequent analysis on the earth's surface.

It should be noted that $Cf^{252}$ is only one isotope in a group of artificially produced elements that frequently are referred to as the "transplutonium" series. Many of the other isotopes of elements in this series are suitable for use in connection with the invention, the $Cf^{252}$ being identified for purposes of illustration.

For a better understanding of the present invention together with other and further objects thereof, reference is had to the following description taken in connection with the accompanying drawings, the scope of the invention being pointed out in the appended claims.

BRIEF DESCRIPTION OF THE DRAWING

The sole FIGURE of the drawing shows a schematic diagram of a logging tool illustrating the principles of the invention in which the electrical circuits associated therewith are shown in block diagram form.

DESCRIPTION OF THE PREFERRED EMBODIMENTS

A typical apparatus for accomplishing the invention is shown in the drawing. Accordingly, a borehole 10 traverses an earth formation 11. Illustratively, the borehole 10 is filled with a drilling fluid 12 that ordinarily is used to control the pressure within the borehole 10, to lubricate the drill bit (not shown), and to flush drill cuttings out of the borehole (also not shown). Filtrate from the drilling fluid 12 ordinarily seeps into the formation 11 and deposits a residue of solid matter or mudcake 13 on the borehole wall.

Although the embodiment of the invention in the drawing is shown in an uncased or open borehole, the invention also may be used in boreholes that are cased with steel tubing cemented to the formation.

The invention also can be used after the well has been completed and production tubing installed within the steel casing in order to extract petroleum from the earth formation 11.

A logging tool embodying principles of the invention comprises a housing 14 that ordinarily retains water-tight integrity under borehole temperatures and pressures. Within, and at the lower end of the housing is a neutron generator 15. For illustrative purposes the generator 15 is the ion accelerator type in which ionized deuterium and tritium are accelerated to a target (not shown) through an electrical field. The ions produce neutrons as a result of impact with other deuterium and tritium nuclei at the target.

The neutron generator 15 is controlled or regulated through a downhole neutron generator control circuit 16. The circuit 16 applies activation signals through a conductor 17 to the generator 15. The stability and neutron production of the generator 15 is monitored typically through the ion beam current that is sent through a conductor 20 to the control circuit 16. The neutron generator 15 and the neutron generator control circuit 16 are selectively activated from the earth's surface through operation of an activation circuit 23 that sends control signals through a conductor 24 in an armored cable 25 to the circuit 16. The cable 25, moreover, lowers the logging tool into the borehole and withdraws it, preferably while logging. Depending on the specific embodiment of the invention, the neutron source 15 may be replaced with, for example, an alpha beryllium or "chemical" neutron source of which mixtures of plutonium and beryllium, americium and beryllium, and radium and beryllium are most common.

The neutron source 15 is separated from a detector 21 by means of a neutron absorbing or reflecting shield 22. The detector 21 preferably responds to gamma radiation produced in the earth formation 11 as a consequence of neutron reactions with the nuclei in the earth formation elements. Usually, a Geiger-Mueller detector, an appropriately cooled semiconductor detector an ion chamber or a scintillation counter are suitable for this purpose.

Also depending on the characteristics of the formation 11 and the specific embodiment of the invention, the detector 21 can be selected from the group that responds directly to neutrons scattered back to the housing 14 from the formation 11. In this connection, boron trifluoride and helium 3 neutron detectors are adequate.

Signals from the detector 21 are sent through a conductor 26 to a downhole signal processing circuit 27. The circuit 27 typically may discriminate against noise, and select detector signals that are related to gamma rays of specific energies in order to amplify these signals and code or otherwise prepare them for transmission through a conductor 30 in the cable 24 to a signal conditioning circuit 31 on the earth's surface. Alternatively, some or all of this signal processing can be accomplished on the earth's surface, rather than in the borehole 10.

In accordance with the invention, the source 32 generates neutrons primarily through the spontaneous disintegration of the transplutonium element californium 252 ($Cf^{252}$). This isotope of the element californium is one of a group of artificially produced elements that are described in the brochure titled "Synthetic Transuranium Elements," prepared and distributed by the U.S. Atomic Energy Commission, and in the article "Transplutonics: Promising Neutron Sources for Research" by Robert L. Stetson, *Nucleonics*, vol. 24, no. 11, November 1966.

Because $Cf^{252}$ produces an average of three to four neutrons in each spontaneous fission, a small quantity of this isotope in the logging tool produces an abundant neutron population. For example, $Cf^{252}$ emits 3,84 neutrons in each fission with an emission rate of between 2 and $3 \times 10^{12}$ neutrons per second per gram. These neutrons, moreover, are emitted with an average energy of 2.3 MeV. In the embodiment shown, the neutrons irradiate the earth formation 11 that is adjacent to the source 32. A typical $Cf^{252}$ source 32 preferably has a strength of $10^9$ neutrons per second. Other transplutonium elements, of which californium 254 and curium 246 are typical, also can be used in connection with the invention, the $Cf^{252}$ isotope being shown for illustrative purposes.

A detector 33 associated with the $Cf^{252}$ source is separated from the source 32 by means of a neutron reflector or shield 34 which may have different physical characteristics than the shield 22 used in connection with the neutron generator 15 because of the difference in the average energies of the neutrons emitted from the generator 15 and the source 30. As described in connection with the detector 21, the detector 33 may be chosen to respond either to gamma radiation that is initiated through neutron absorption in the formation nuclei, or on direct detection of neutrons scattered back to the detector 33 from the earth formation 11. Specific detector choice is determined, in large measure, on the basis of the formation characteristics and information sought from the logging technique.

Signals from the detector 33 are sent through a conductor 35 to a downhole signal processing circuit 36. As described in connection with the circuit 27, the processing circuit 36 may comprise noise discrimination, amplification, pulse height sorting and signal coding for transmission through a conductor 37 in the cable 25 to a signal conditioning circuit 40 on the earth's surface.

Output signals from the conditioning circuits 31 and 40 are sent through conductors 41 and 42, respectively, to a signal comparison circuit 43. Illustratively, the comparison circuit 43 may comprise an electrical computation circuit. This function may constitute a parametric representation of the dependence of the respective counting rates of the Al and Si constituents. The comparison circuit 43 produces an output signal in a conductor 44 that corresponds to a function of the formation activations registered in the detectors 21 and 33. This signal in the conductor 44 is received in a recorder 45.

Frequently, the recorder 45 produces a magnetic tape that corresponds to the signal in the conductor 44 as a function of borehole depth. In tape form, the signal can be stored or used almost simultaneously in a system for further processing and analysis. The recorder 45 also might produce a photographic or ink trace of the signal in the conductor 44 as a function of the borehole depth on an appropriate graph.

SHALE LOGGING (ALUMINUM)

In order to log for shale in accordance with one embodiment of the invention, the neutron generator 15 is energized through signals from the circuit 23 on the earth's surface. The 14 MeV neutrons irradiate the earth formation 11 and react with silicon nuclei.

Silicon, it will be recalled, is a constituent in the sand with which shale frequently is mixed. Silicon has a neutron reaction energy threshold of about 4.5 MeV that effectively bars this reaction for neutrons that have energies less than this value. Reactions between high energy neutrons and silicon nuclei produce the $Al^{28}$ isotope through a neutron-proton event. Thus, if only 14 MeV neutrons from the generator 15 irradiate the formation 11, the 1.8 MeV gamma rays emitted from the $Al^{28}$ isotope would necessarily fail to provide shale information or, perhaps, create a misleading identification of shale in a formation that contained only sand. Thus, the activation gamma rays registered in the detector 21 as a consequence of the high energy neutrons from the generator 15 do not provide a reliable shale measurement.

These activation gamma rays registered in the detector 21 result in signals that are transmitted through the conductor 30 to the signal conditioning circuit 31 on the earth's surface. The circuit 31 discriminates against noise and spurious signals, and produces either an analog or digital response that corresponds, at least in part, to the high-energy neutron induced 1.8 MeV gamma ray activity in the formation 11.

Because the $Cf^{252}$ source 32, in spite of its intense neutron production, generates relatively few neutrons that have energies greater than 4.5 MeV silicon-$Al^{28}$ activation threshold, the $Cf^{252}$ neutrons are reduced to thermal equilibrium with the formation 11 through nuclear collisions and are absorbed in the $Al^{27}$ that identifies the presence of shale. The $Al^{27}$ neutron reaction produces $Al^{28}$ that has a half-life of 2.3 minutes and decays also through the emission of a characteristic 1.8 MeV gamma ray.

These latter gamma rays are registered in the detector 33 and are transmitted after processing to the earth's surface in the conductor 37 to the signal conditioning circuit 40. The circuit 40 processes the $Cf^{252}$ induced $Al^{28}$ signal in the manner described in connection with the conditioning circuit 31. As hereinbefore mentioned, the signals in the conductors 41 and 42 are compared in the comparison circuit 43 to provide an output signal in the conductor 44 that is registered in the recorder 45. This signal corresponds to the difference between the silicon activation within the formation 11 and the aluminum activation in the formation that identifies shale in the sand. Alternatively, both logging signals can be stored on tape or punched cards for further processing, of which the foregoing description is illustrative.

As the logging tool, for example, is drawn upward through the borehole 10 and passes from a "clean" sand formation into a shaly sand, all other things being equal, the difference between the $Cf^{252}$-induced $Al^{28}$ activation and the neutron generator-induced activation can be expected to change, inasmuch as the $Al^{27}$ activation from $Cf^{252}$ neutrons increases.

The comparison circuit 43, in performing the aforementioned operation, might subtract or compute the ratio of the two signals. In this latter situation, a change in the ratio is indicative of an increase or decrease in the aluminum (and hence, shale) concentration within the formation 11, depending on the signal that is chosen as the divisor.

Through appropriate calibration in laboratory or field formations of known chemical composition, the signals in the conductors 41 and 42 can establish a quantitative measure of the shale concentration within the formation 11. In this regard, the "shale fraction" parameter (volume of shale/unit volume of formation) is often useful and may be combined with other logging data to provide more refined analyses of earth formation characteristics.

SHALE LOGGING (SODIUM)

Sodium, as aluminum, can be used as a shale indicator. The sodium in the formation 11 is activated through thermal neutron capture to produce an isomer with a 20 millisecond half-life with a 470 keV gamma ray emission. This same sodium activity also can be produced through fast neutron interactions in aluminum and magnesium, leading to confusing interpretation problems if alpha-beryllium or deuterium-tritium neutrons are used. The lower average energy of neutrons from $Cf^{252}$ will ameliorate this situation because the reaction in aluminum has a 3.7 MeV threshold and the reaction in magnesium has a 5.4 MeV threshold.

In this regard, the formation 11 is logged with the generator 15, energized as described in connection with the foregoing aluminum logging technique. Alternatively, the neutron generator 15 can be de-energized and the log taken entirely on the basis of the neutrons emitted from the $Cf^{252}$ source 32.

The sodium activity can be identified through energy selection of the 470 keV gamma ray. Other activities produced in the formation 11, however, might interfere. Accordingly, it is desirable to take advantage of the isomeric sodium half-life as another means of identification. This requires a pulsed $Cf^{252}$ and a time-gated detection system. Pulsing can be obtained through mechanical and electromagnetic source shuttling techniques.

COPPER ACTIVATION

Logging for copper with the $Cf^{252}$ neutron source 32 may be accomplished with or without the use of the deuterium-tritium neutron generator. In the latter instance neutron generator 15 is deactivated in order to reduce background and extraneous activations induced by its higher energy neutrons. The 1 MeV gamma rays characterizing neutron-copper reactions are registered in the detector 33 for transmission to the earth's surface and further analysis.

Although the housing 14 shown in the drawing is transported freely through the borehole 10, eccentering the logging tool may, in some instances, be preferred. It also may be found advantageous to collimate or scatter in a preferred direction the neutrons from the source 32. In a similar manner, the detectors 21 and 33 also may individually or both be collimated or eccentered toward one side of the borehole wall. The low energy and high level of neutron production characterizing these transplutonium elements also can be used to log for other materials than those described herein, and also to log for earth formation characteristics (e.g., porosity, hydrogen concentration).

For example, the neutron slowing down or diffusion properties in an earth formation are different for neutrons emanating with distinct average energies from the different sources. Accordingly, observations conducted, for instance, with two detectors and two sources that are directed to these features can provide, for example, information on variations in Fermi age with regard to the formation in question. Further in this connection, neutrons of different average energies often exhibit distinctive depths of investigation into the earth formation. Thus, the illustrative two detector logging tool shown in the drawing will enable the shallow depth neutron signal to be subtracted from or otherwise used to compensate the deeper penetrating neutron signal in order to establish a more accurate understanding of the earth formation characteristics.

It should also be noted that the processed detector signals in the conductors 41 and 42 may be individually registered in the recorder 45 for further study, if desired.

As a practical matter, the generator 15 and the detector 21 can be transported through the borehole in a separate housing during a different logging run than that which is used to draw the source 32 and the associated detector 33. In any case, the detector 21 should be spaced about 3 feet from the source 32, and the generator 15 should be spaced about the same distance from the detector 33 to prevent "crosstalk" between the two systems.

What is claimed is:

1. An earth formation logging system comprising, a transplutonium neutron source for emitting neutrons that have an average energy that is less than the activation threshold energy for a silicon-aluminum nuclear reaction, a further neutron source for emitting neutrons that have an average energy that is at least equal to said silicon-aluminum activation threshold, detector means responsive to neutrons in the earth formation that are emitted from said sources, and circuit means for comparing said detector means response to said transplutonium source neutrons and said further source neutrons.

2. A logging system according to claim 1 wherein said neutron source comprises californium 252.

3. An earth formation logging system comprising, a transplutonium neutron source for emitting neutrons for thermal absorption in sodium, detector means responsive to the neutrons in the earth formation that are emitted from said source, circuit means responsive to said detector means for producing a signal that identifies nuclear reactions between said sodium and neutrons emitted from said transplutonium source, another neutron source for emitting neutrons of an average energy that is different from the average energy characterizing said transplutonium neutron source, and a circuit for producing a signal that characterizes the earth formation response to neutrons emitted from said another neutron source for comparison with said transplutonium neutron signal in order to identify more clearly the nuclear reactions between said sodium and neutrons emitted from said transplutonium source.

4. A system according to claim 9 further comprising additional circuit means for energizing said another neutron source to produce pulses of neutrons that are spaced in time.

5. A system according to claim 4 wherein said comparison circuit further comprises means for identifying the earth formation chlorine concentration and contrasting said chlorine concentration with said sodium signal.

* * * * *